US011689437B1

(12) United States Patent
Vatov et al.

(10) Patent No.: US 11,689,437 B1
(45) Date of Patent: Jun. 27, 2023

(54) MONITORING WORKFLOW TIMING INFORMATION RELATED TO HTTP REQUESTS TO WEB SERVERS

(71) Applicant: VMware, Inc., Palo Alto, CA (US)

(72) Inventors: Ivan Veselinov Vatov, Sofia (BG); Georgi Milenov Dinov, Sofia (BG); Mincho Antonov Tonev, Sofia (BG); Milen Vasilev Borchev, Sofia (BG)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 17/568,147

(22) Filed: Jan. 4, 2022

(51) Int. Cl.
*G06F 15/173* (2006.01)
*H04L 43/0811* (2022.01)
*H04L 43/045* (2022.01)

(52) U.S. Cl.
CPC ........ *H04L 43/0811* (2013.01); *H04L 43/045* (2013.01)

(58) Field of Classification Search
CPC .......................... H04L 43/045; H04L 43/0811
See application file for complete search history.

(56) References Cited

U.S. PATENT DOCUMENTS

| 2011/0252087 | A1* | 10/2011 | Zuzga | G06F 11/3495 709/203 |
| 2017/0068608 | A1* | 3/2017 | Covell | G06F 11/3419 |
| 2017/0255707 | A1* | 9/2017 | Trestor | G06F 16/9574 |

* cited by examiner

*Primary Examiner* — Padma Mundur

(57) ABSTRACT

Described herein are systems, methods, and software to manage workflow monitoring between a client and one or more web servers. In one implementation, a client may initiate a workflow and maintain timing information associated with HTTP requests to one or more web servers as part of the workflow. The client further obtains, from the one or more web servers, log information for operations initiated from the HTTP requests to the one or more web servers and generates a timing diagram display based on the timing information and the log information.

15 Claims, 5 Drawing Sheets

MONITORING WORKFLOW TIMING INFORMATION RELATED TO HTTP REQUESTS TO WEB SERVERS

TECHNICAL BACKGROUND

Software workflows, which can include software wizards, are user interfaces that can present a user with a sequence of steps that can lead a user to implement a desired operation. The workflows can be used to configure an application, install an application, configure virtual networks or a set of one or more virtualized endpoints, or provide some other operation. For example, a workflow may provide a user with a sequence of steps to configure a cluster of virtual machines.

In implementing the operations for the workflow, the workflow may use HTTP requests to communicate with one or more web servers. The HTTP requests may be used to request information from the server, provide information to the server, delete information from the server, or provide some other operation. For example, an HTTP request may comprise a "PUT" request to replace a target resource with uploaded content.

However, while software workflows can provide users with steps to implement desired operations, difficulties arise for developers in testing and monitoring the different workflows. Specifically, developers may have difficulties in identifying problems in HTTP requests, such as latency or delay, when a workflow is executed. These problems may occur in the communication of the HTTP request to the web server, the response to the HTTP request by the web server, implementing the methods in the web server, or at some other instance during the execution of the workflow. These problems can further be compounded when a workflow requires a large quantity of HTTP requests or requests to multiple web servers.

SUMMARY

The technology described herein manages workflow timing information related to HTTP requests to web servers. In one implementation, a client system identifies a request to monitor a workflow in the client system and, in response to the request, maintains timing information associated with HTTP requests to one or more web servers in association with the workflow, wherein the timing information comprises at least timestamps associated with initiating each of the HTTP requests and receiving responses to each of the HTTP requests. The client system further obtains, from the one or more web servers, log information for operations initiated from the HTTP requests to the one or more web servers, wherein the log information comprises at least timestamps associated with starting each of the operations and ending each of the operations. Once obtained, the client system generates, for display, a timing diagram, wherein the timing diagram indicates times for initiating each of the HTTP requests and receiving responses to each of the HTTP requests, and wherein the timing diagram further indicates times for starting each of the operations and ending each of the operations.

DETAILED DESCRIPTION

Figure 1:
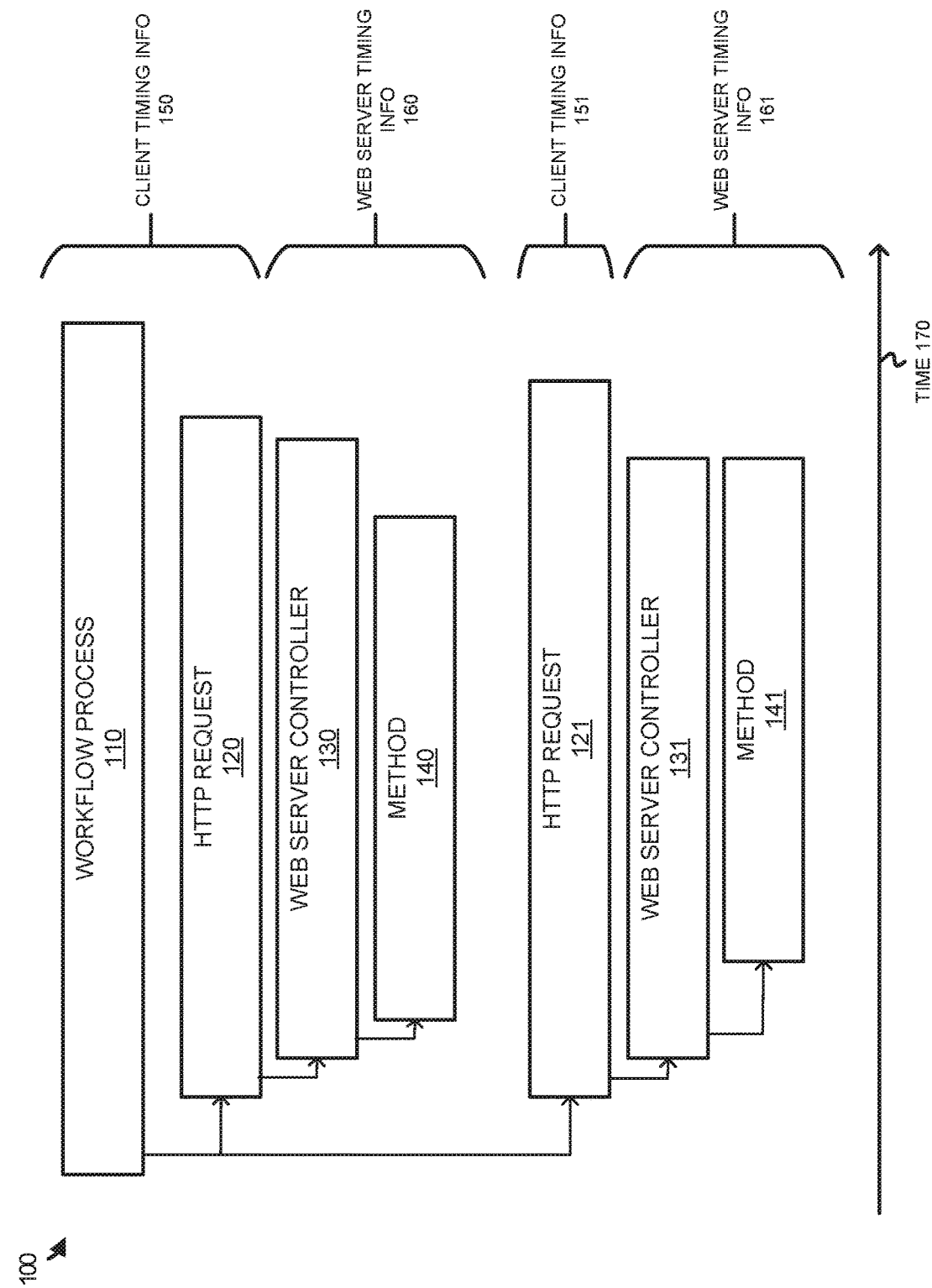
FIG. 1 illustrates a timing diagram associated with a workflow and HTTP requests associated with the workflow according to an implementation.

FIG. 1 illustrates a timing diagram 100 associated with a workflow and HTTP requests associated with the workflow according to an implementation. Timing diagram 100 includes workflow process 110, HTTP requests 120-121, web server controllers 130-131, and methods 140-141, which is representative of information that can be provided as a user interface to a developer. Timing diagram 100 further includes client timing information 150-151, web server timing information 160-161 and time axis 170.

In developing a workflow for users of a software application, developers may desire to monitor timing information associated with a user interacting with the workflow. For example, a workflow may comprise a software wizard that can be used to configure one or more virtualization endpoints (e.g., virtual machines, containers, and the like), configure networking for one or more virtualization endpoints, configure one or more applications (web based or local), or some other workflow operation. Although described as a software wizard, a workflow can represent any set of events in association with an application. The events may comprise user feedback, such as clicking, selecting from a set of options, or some other event that corresponds to a set of actions. For example, a workflow may comprise a set of operations that are used to configure a cloud service in one or more virtual machines. In some implementations, the workflows may require HTTP requests to one or more web servers to implement the desired operations. The HTTP requests may be used to retrieve information from the web server, communicate information to the web server, delete information from the web server, or provide some other operation in association with the web server.

Here, a user initiates workflow process 110 at a client system, wherein the client system may comprise a physical computing system, a virtual machine, or some other client system. Workflow process 110 may be initiated in a browser or may comprise a standalone application in some examples. A user initiating workflow process 110 may indicate the workflow to be monitored in some examples, wherein the user may identify a start and end point of the workflow to dictate the monitored information associated with the workflow. For example, the user may indicate that workflow process 110 comprises a software wizard to configure one or more virtual machines in a virtual network. When the user starts the workflow, by providing a user interaction to start the workflow (e.g., starting the wizard), the client system may initiate a monitoring operation to maintain timing information associated with HTTP requests associated with workflow process 110. Specifically, the client system may maintain client timing information 150-151 that corresponds to HTTP requests 120-121 and workflow process 110, wherein the timing information may include identifying when each of the HTTP requests is initiated and when each of the HTTP requests are completed or have received a response to the request.

In addition to maintaining the local client timing information 150-151, each of the web servers used in the workflow may also maintain log information associated with the HTTP requests to the web servers. Specifically, each of the web servers may log information associated with initiating and completing various operations, including controller operations, methods, or some other timing information associated with processing the HTTP request at the web server. Using the example, of HTTP request 120, the web server associated with the request maintains web server timing information 160 as a log that includes timing information associated with web server controller 130 and method 140. The start time associated with web server controller 130 may occur when the HTTP request is received, and the end time may correspond to when the controller provides a response to the request or ends operations associated with the request. Additionally, method 140 may represent a start and end time for a method initiated from the web controller, wherein the method may post data to the web server, retrieve data from the web server, replace data in the web server, or provide some other operation at the web server. Although demonstrated with a single method, multiple methods can be initiated from a single HTTP request. For example, method 140 may initiate one or more additional methods and the web server may maintain a log that indicates start and stop times associated with each of the methods. The methods may be used to post data to the web server, retrieve data from the web server, replace data in the web server, or provide some other operation at the web server. In some implementations, these methods may execute longer than the workflow process or the HTTP request itself. For example, while the HTTP request may be completed following a response from the web server, one or more methods may continue executing in the web server to support the operation.

In addition to web server timing information 160, the same web server or an additional web server may maintain web server timing information 161 associated with HTTP request 121. Specifically, web server timing information 161 may correspond to start and end times associated with web server controller 131 and method 141. Again, while demonstrated with executing a single method, multiple methods can be initiated in response to the HTTP request.

After completing workflow process 110, the client system obtains the web server timing information 160-161 from the one or more web servers and uses the information to generate a timing diagram display of the timing information associated with workflow process 110. Web server timing information 160-161 may comprise one or more logs in some examples that indicate the timing information associated with starting the web server controllers and the methods. The display may include times associated with client timing information 150-151, as well as web server timing information 160-161. In the example of timing diagram 100, the times are displayed as tiers and correspond to the start and end times of the workflow process 110, HTTP requests 120-121, web server controllers 130-131, and methods 140-141.

In some examples, the client system may identify one or more operations of interest at the web servers based on the web server timing information 160-161, wherein the operations may comprise the controller operations or method operations. The operations of interest may occur when an operation executes for longer than a defined period, shorter than a defined period, or for some other factor satisfying at least one criterion. Other operations of interest may occur when comparing a current execution of the workflow with a previous execution of the same workflow and identifying differences between the operations in the current workflow and the previous execution of the workflow. Additionally, operations of interest may comprise latencies associated with generating the HTTP request and the web server controller being initiated, latencies associated with initiating the one or more methods from the controller, or some other latency associated with the HTTP requests to the one or more web servers. The operations of interest may be identified when any timing attribute (latency, length, and the like), satisfies criteria (e.g., maximum length of time) for an operation of interest. In at least one implementation, when an operation of interest is identified, the operation of interest may be promoted in the timing diagram, wherein the promotion may include highlighting, increasing the size, bolding, or providing some other promotion of the operation of interest in relation to other operations in the timing diagram.

In some implementations, the client system may identify one or more HTTP requests of interest based on the log information from the one or more web servers or the maintained timing information at the client. The HTTP requests of interest may be identified based on the duration of the HTTP request exceeding a threshold duration, based on the HTTP request falling below a threshold duration, or some other factor. In some implementations, the HTTP requests of interest may be identified based on latency associated with communicating the request to and from the web server, may be identified based on a comparison of the duration of the request to previous iterations of the workflow (e.g., a duration of the HTTP request during a first iteration of the workflow to a second duration of the HTTP request during a second iteration of the workflow), based on changes in the methods performed as part of the workflow compared to previous iterations of the workflow, or some other factor. The HTTP requests of interest may be identified when an HTTP request of interest satisfies one or more criteria, such as a threshold (e.g., duration of a HTTP request). When a HTTP request of interest is identified, the timing diagram may promote the HTTP request in relation to other HTTP requests in the timing diagram. The promotion may include increasing the size, highlighting, generating a flag, or otherwise promoting the HTTP request of interest over other HTTP requests as part of the workflow. The promotion may also provide a summary or an indication of what triggered the HTTP request to be identified as a request of interest.

Although not demonstrated in the example of timing diagram 100, the client may further maintain information about the user feedback associated with the workflow. The user feedback may include selections by the user that can trigger one or more HTTP requests. From the user feedback information, the client may identify one or more of the user interactions in the timing diagram and may demonstrate the HTTP requests that occur because of the selection.

Although described herein using HTTP requests, requests using any type of network protocol can be monitored. The requests may comprise File Transfer Protocol (FTP) requests, Transmission Control Protocol (HTTP) requests, or some other network protocol request in a workflow. For example, an application may generate a TCP request to obtain data from a server, wherein the client generating the request and the server may each maintain timestamp information associated with the request. The client may monitor the timestamps of generating the TCP request and the TCP response, while the server may monitor timestamps associated with executing one or more methods or services at the server to support the request. The server may then provide information back to the client to support the generation of the summary.

Figure 2:
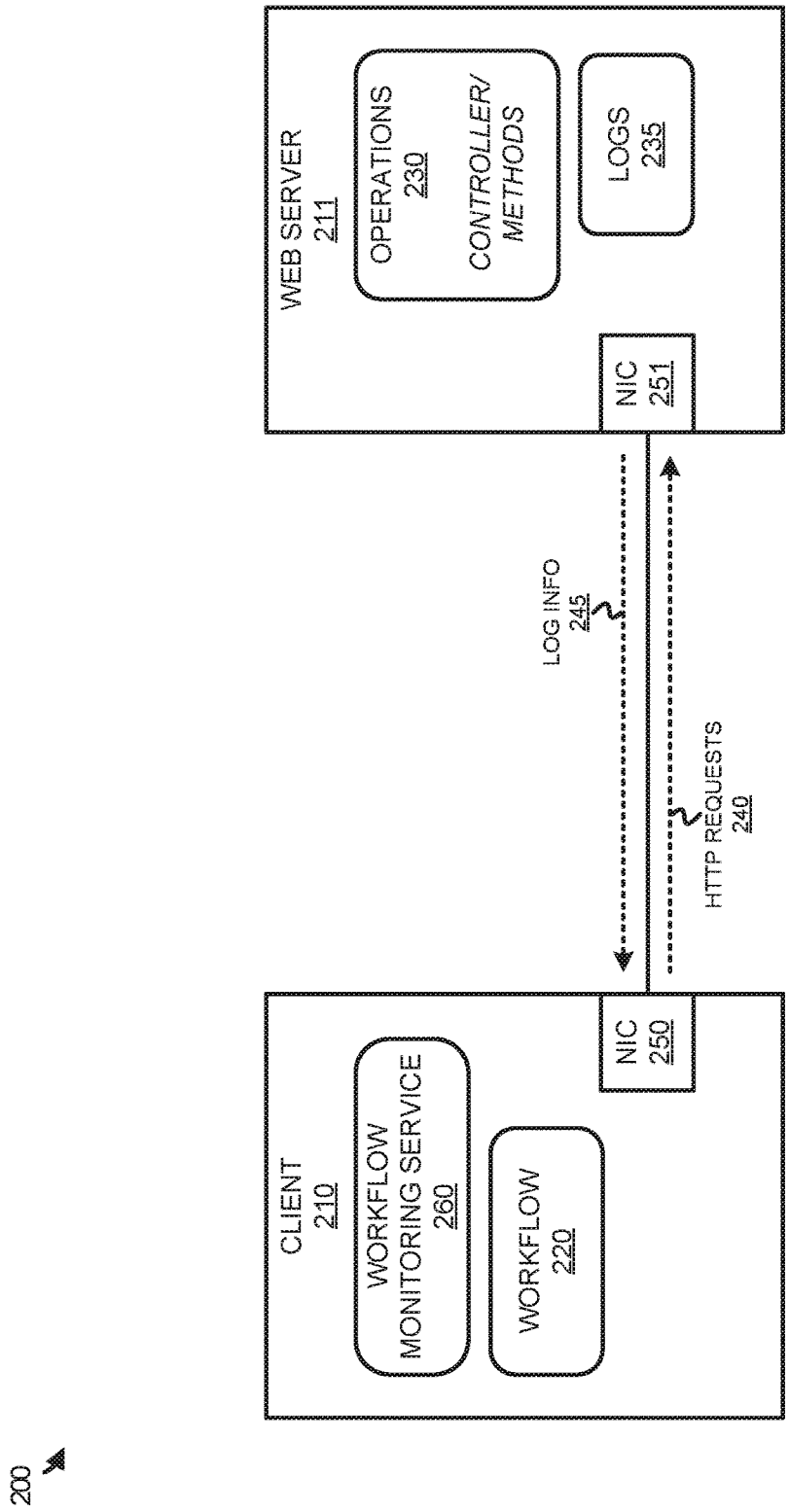
FIG. 2 illustrates a computing environment to monitor timing information associated with HTTP requests for a workflow according to an implementation.

FIG. 2 illustrates a computing environment 200 to monitor timing information associated with HTTP requests for a workflow according to an implementation. Computing environment 200 includes client 210 and server 211. Client 210 includes workflow monitoring service 260, workflow 220, and network interface (NIC) 250. Server 211 further includes operations 230, logs 235, and NIC 251. Client 210 provides HTTP requests 240 to server 211 and server 211 provides log information 245 to client 210.

In computing environment 100, workflow monitoring service 260 is used to monitor information associated with HTTP requests as part of workflow 220. Workflow 220 may comprise a software wizard or some other stepped software configuration operation that requires one or more HTTP requests to provide the desired operation. Workflow 220 may be used to configure an application, configure one or more virtualized endpoints, configure networking operations, or provide some other operation. When the workflow is initiated (i.e., started) by a user at client 210, workflow monitoring service 260 may monitor or maintain timing information associated with HTTP requests 240 to server 211 in association with workflow 220, wherein the timing information comprises at least timestamps associated with initiating each of the HTTP requests. The timing information may further comprise timestamps associated with receiving response to the HTTP requests in some examples.

As the HTTP requests are communicated to server 211, server 211 may maintain logs 235 that correspond to timing information for operations 230 initiated from HTTP requests 240. Operations 240 may include controller operations and method operations. The controller operation can be used to trigger one or more method operations based on the HTTP request. The information maintained in logs 235 may include timestamps associated with starting and ending each of the operations. For example, a method operation initiated as part of an HTTP request may be added to logs 235 to indicate the start time of the operation and the stop time of the operation.

Log information 245 is then provided back from logs 235 to client 210, permitting client 210 to generate a timing diagram for workflow 220 using the locally maintained timing information and log information. The timing diagram may indicate times for initiating each of the HTTP requests to server 211, times for receiving responses to each of the HTTP requests to server 211, times for starting each operation of operations 230 at server 211 initiated in response to the HTTP requests, times for ending each operation of operations 230 at server 211 initiated from the HTTP requests, or some other information. In some implementations, the timing diagram may appear as durations associated with the HTTP requests and operations initiated from the HTTP requests as demonstrated in timing diagram 100 of Figure, although other examples may exist. In some examples, the timing diagram may indicate the spawned operations (controller, method, and the like) spawned from each of the HTTP requests.

Figure 3:
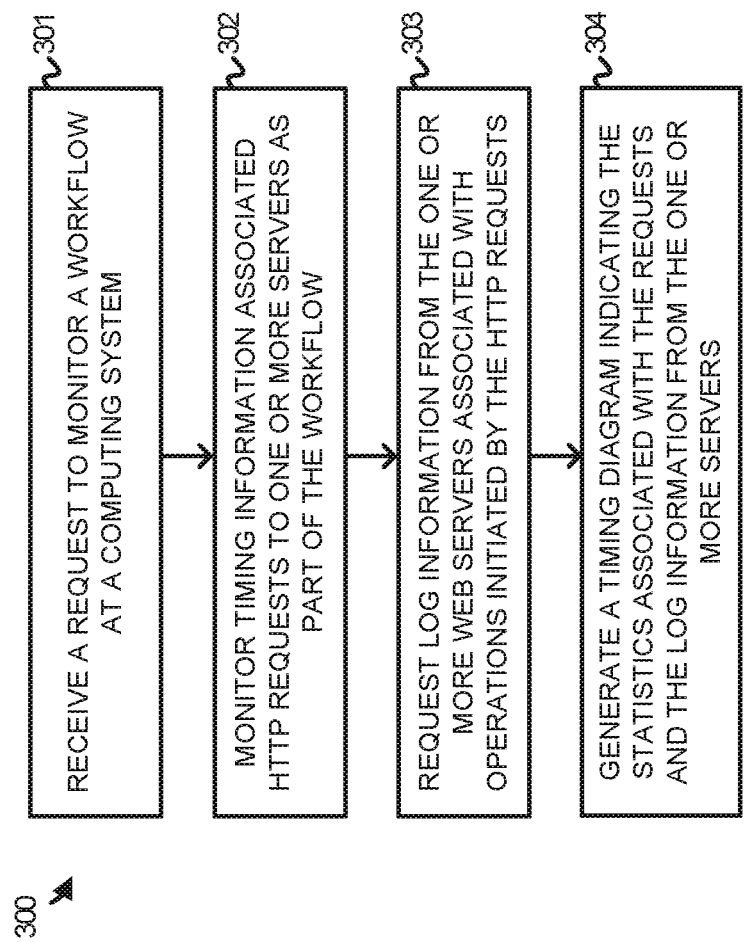
FIG. 3 illustrates a method of operating a client system to monitor timing information associated with HTTP requests for a workflow according to an implementation.

FIG. 3 illustrates a method 300 of operating a client system to monitor timing information associated with HTTP requests for a workflow according to an implementation. The steps of method 300 are referenced parenthetically in the paragraphs that follow.

In method 300, a client system identifies (301) a request to monitor a workflow at the client system. The workflow may comprise a software wizard in some examples that permits a user to configure an application using a plurality of steps, wherein the steps may require HTTP requests to one or more web servers. The workflow may be defined by the user in some examples, wherein the user may identify the start and endpoint for the workflow, such as user input that triggers the start and end of the workflow. In response to the request, method 300 further maintains (302) timing information associated with HTTP requests to one or more web servers in association with the workflow, wherein the timing information comprises at least timestamps associated with initiating each of the HTTP requests and receiving responses to each of the HTTP requests. For example, a workflow may require ten HTTP requests to a web server. For each of the request, the client system may identify a timestamp for the HTTP request to the web server and may further monitor the timestamps for when each HTTP request is completed, or a response is returned for the HTTP request.

In addition to maintaining the timing information at the client system, the client system may further obtain (303), from the one or more web servers, log information for operations initiated from the HTTP requests to the one or more web servers, wherein the log information comprises at least timestamps associated with starting each of the operations and ending each of the operations. In some implementations each of the web servers may maintain one or more logs that can identify time stamps associated with operations triggered by the HTTP requests. The operations may comprise controller operations or methods initiated from the controller, wherein the controller may be used to schedule and initiate the methods that correspond to the HTTP request. The log information may include timestamps for when each operation was initiated and when each operation was completed. For example, when an HTTP request is received at the web server, the web server may log a timestamp when the HTTP request was received by the controller. Additionally, the log information may include timestamps for when each operation concludes or ends, which can be used to determine a duration associated with each of the operations. In some examples, the log information may be provided to the client system when workflow concludes, wherein the client system may request and receive the log information from the web server. In other examples, the log information may be provided to the client system after the completion of one or more of the operations.

In some implementations, when the HTTP request is generated by the client, identifier information is added in the header of the request to bind or uniquely associate the HTTP request to a corresponding controller operation. The identifier information can be used to distinguish each of the HTTP requests originating from the client, such that operations initiated for each of the requests can be traced to a single HTTP request. For example, a first HTTP request may initiate a first controller operation and a second HTTP request may initiate a second controller operation. To uniquely identify or associate the controller operations to the HTTP requests, an identifier can be included in each of the requests, such that the log information can be associated with each unique request.

After the log information is obtained from the one or more web servers, method 300 further generates (304), for display, a timing diagram, wherein the timing diagram indicates times for initiating each of the HTTP requests and receiving responses to each of the HTTP requests, and wherein the timing diagram further indicates times for starting each of the operations and ending each of the operations. In some implementations, the timing diagram may appear like timing diagram 100 represented in FIG. 1, but other examples may exist. In some examples, each HTTP request may be linked to the corresponding operations at the web server, wherein dependent operations can be linked to the source HTTP request or calling operation. For example, an HTTP request from a client can be received by a web server initiating a controller operation. The controller operation can call a first method and, subsequently, call a second method, wherein each method call be reflected in the timing diagram as originating from the controller operation based on the log information provided by the web server. In some examples, an operation at a web server can execute longer than the workflow process, wherein a termination event for the workflow process can occur before a method is terminated at the web server.

In some implementations, the client system may further identify items of interest in the timing diagram for the workflow. The items of interest may correspond to HTTP requests of interest or operations of interest at the web server. The HTTP requests of interest or operations of interest may be identified when a request or operation has a duration that exceeds a threshold, when a request or operation falls below a duration minimum, when the request or operation duration differs from a previous iteration of the workflow by a threshold amount, or some other criteria to identify HTTP requests or operations of interest. As an example, when the duration of an HTTP request exceeds a threshold, a flag may be generated to promote or identify the HTTP request over other HTTP requests. The promotion of the HTTP request in the timing diagram may include highlighting the corresponding HTTP request, generating a notification for the user requesting the timing diagram, or some other promotion of the HTTP request. Similar promotions may be made of operations of interest identified.

In some examples, additional information may be provided as part of the timing diagram. The additional information may include timestamps associated with user feedback to the workflow, wherein the feedback may further be mapped to one or more HTTP requests that occur in response to the feedback. The feedback information may be maintained as part of the timing information at the client system.

Figure 4:
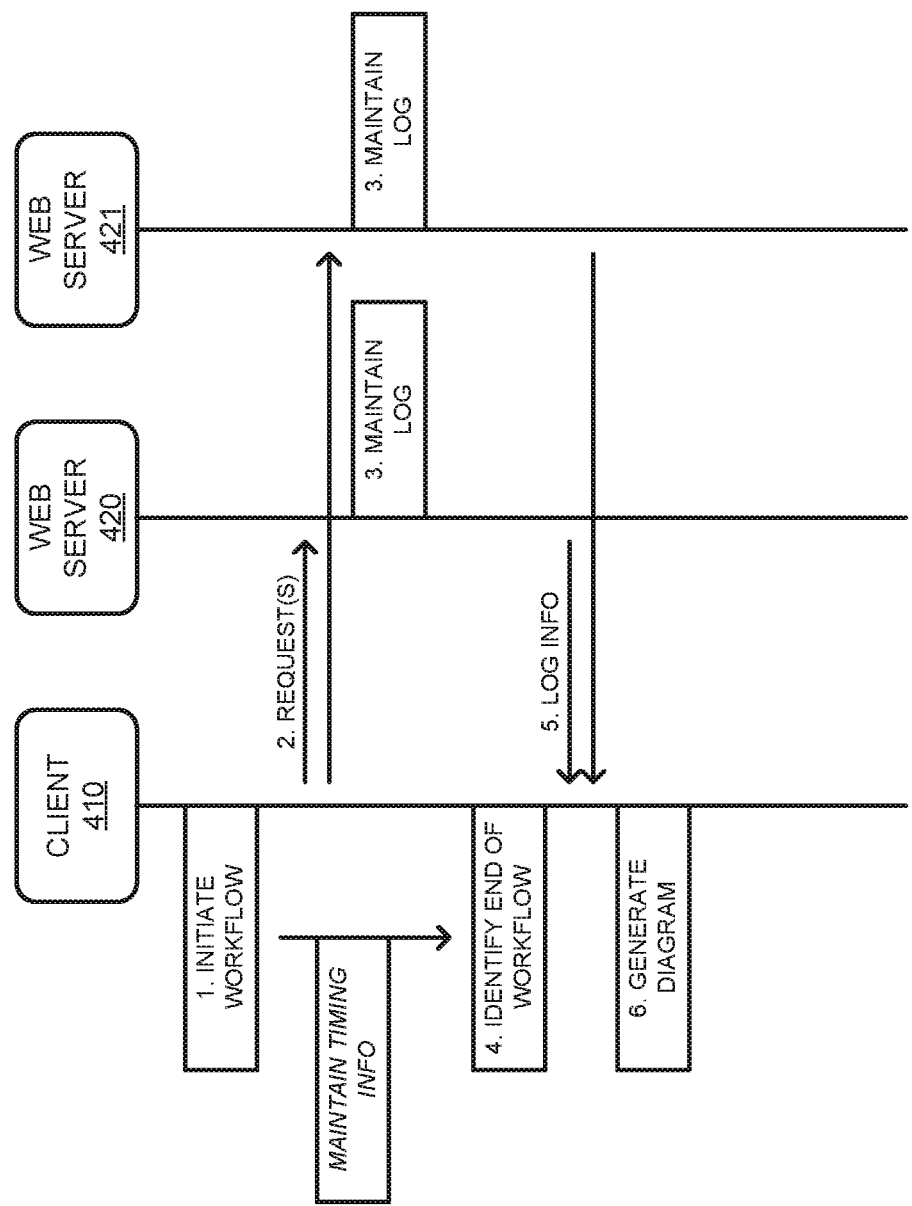
FIG. 4 illustrates a diagram of managing timing information associated with a workflow according to an implementation.

FIG. 4 illustrates a diagram 400 of managing timing information associated with a workflow according to an implementation. Diagram 400 includes client 410 and web servers 420-421. While demonstrated with two web servers in the example of diagram 400, any number of web servers may be used to support the workflow.

As depicted in diagram 400, client 410 initiates, at step 1, a workflow that can be used to configure an application, configure a virtual cluster, configure a networking configuration, or provide some other operation. In some examples, the workflow may comprise a software wizard that permits a user to follow one or more steps via user feedback to implement the desired operation. For example, the user may generate user feedback to provide preferences in association with the workflow, wherein the feedback may trigger HTTP requests to one or more web servers.

After initiating the workflow one or more requests are communicated to web server 420 and web server 421 at step 2. The HTTP requests may be used to obtain information from the web server, store data to the web server, or provide some other action in association with the web server. At each of the web servers 420-421, the web servers may maintain log information associated with timestamps for operations initiated by the HTTP requests at step 3. As an example, when client 410 generates an HTTP request to web server 420, web server 420 may receive the request and initiate a controller operation to manage the initiation of method operations to support the request. The method operations may also initiate additional methods to support the HTTP request. The timestamps may include when each of the operations and may further include timestamps associated with the completion of each of the operations. The timestamps may be used to identify a duration of each of the operations at the web server, including the duration of the controller operations and the method operations initiated from the controller operations.

As the log information is maintained by each web server of web servers 420-421, client 410 may identify an end of the workflow at step 4, wherein identifying the end of the workflow may occur when a user provides feedback indicating the end of the workflow (e.g., a selection of a button on the user interface at client 410), may occur when the software wizard of the workflow closes, or may occur based on some other conclusory event. In response to concluding the workflow, client 410 obtains the required log information from web servers 420-421. Although demonstrated as obtaining the log information following the end of the workflow, at least a portion of the log information may be communicated back to client 410 prior to the conclusion of the workflow.

After receiving the log information from web servers 420-421, client 410 generates, at step 6, a timing diagram indicating the start and end times associated with the HTTP requests and the operations at the various web servers. Specifically, the timing diagram may use the timing information maintained locally by client 410 corresponding to the HTTP requests and the log information corresponding to the operations at the web servers to generate the timing diagram. In some implementations, the timing diagram may indicate start and end times for the HTTP requests as well as start and end times for the operations at the web servers. The timing diagram may indicate the HTTP requests or operations that triggered each subsequent operation. For example, the timing diagram may indicate that an HTTP request triggered the execution of a controller operation, and the controller operation initiated a method operation at the web server.

In some implementations, the timing diagram may further promote or identify HTTP requests of interest or operations of interest based on a variety of factors. These factors may include the duration of the HTTP requests or operations at the web server exceeding a threshold, the duration of the HTTP requests or operations at the web server differing from durations associated with previous executions of the workflow, or some other factor. When promoting the HTTP request or operation of interest, the client may highlight portions of the timing diagram associated with the HTTP request or operation of interest, the client may generate a flag identifying the HTTP request of interest or operation of interest or may provide some other notification indicating the HTTP request of interest or operation of interest.

Although demonstrated in the examples of FIGS. 1-4 as generating the timing diagram at the client, the timing diagram may be generated at some other computing system, including a web server in some examples. In at least one implementation, the timing information from the client and log information from the web servers may be distributed to another computing system capable of generating the timing diagram. The timing diagram can then be generated and distributed to the corresponding client, cached for later viewing on another computing system, or processed in some other manner.

Figure 5:
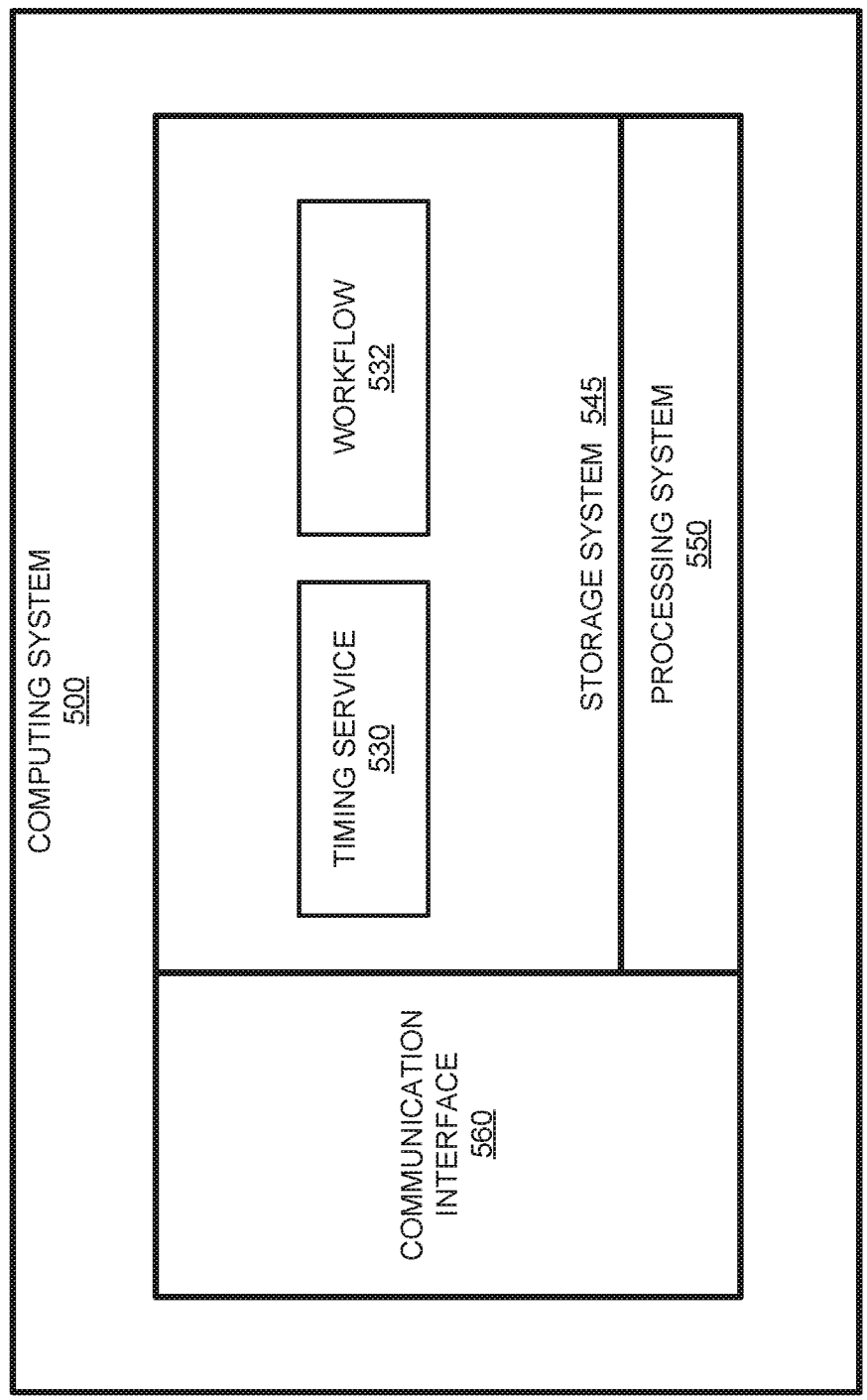
FIG. 5 illustrates a computing system to monitor timing information associated with HTTP requests for a workflow according to an implementation.

FIG. 5 illustrates a computing system 500 to monitor timing information associated with HTTP requests for a workflow according to an implementation. Computing system 500 is representative of any computing system or systems with which the various operational architectures, processes, scenarios, and sequences disclosed herein for a client system can be implemented. Computing system 500 is an example of a client 210 of FIG. 2, although other examples may exist. Computing system 500 includes storage system 545, processing system 550, and communication interface 560. Processing system 550 is operatively linked to communication interface 560 and storage system 545. Communication interface 560 may be communicatively linked to storage system 545 in some implementations. Computing system 500 may further include other components such as a battery and enclosure that are not shown for clarity.

Communication interface 560 comprises components that communicate over communication links, such as network cards, ports, radio frequency (RF), processing circuitry and software, or some other communication devices. Communication interface 560 may be configured to communicate over metallic, wireless, or optical links. Communication interface 560 may be configured to use Time Division Multiplex (TDM), Internet Protocol (IP), Ethernet, optical networking, wireless protocols, communication signaling, or some other communication format—including combinations thereof. Communication interface 560 may be configured to communicate with one or more web servers and other computing systems via one or more networks.

Processing system 550 comprises microprocessor and other circuitry that retrieves and executes operating software from storage system 545. Storage system 545 may include volatile and nonvolatile, removable, and non-removable media implemented in any method or technology for storage of information, such as computer readable instructions, data structures, program modules, or other data. Storage system 545 may be implemented as a single storage device but may also be implemented across multiple storage devices or sub-systems. Storage system 545 may comprise additional elements, such as a controller to read operating software from the storage systems. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. In no case is the storage media a propagated signal.

Processing system 550 is typically mounted on a circuit board that may also hold the storage system. The operating software of storage system 545 comprises computer programs, firmware, or some other form of machine-readable program instructions. The operating software of storage system 545 comprises timing service 530 and workflow 532. The operating software on storage system 545 may further include an operating system, utilities, drivers, network interfaces, applications, or some other type of software. When read and executed by processing system 550 the operating software on storage system 545 directs computing system 500 to operate as described herein. In at least one example, the operating software can provide at least method 300 of FIG. 3.

In at least one implementation, timing service 530 directs processing system 550 to identify a request to monitor workflow 532 on computing system 500, wherein the workflow may comprise a software wizard or some other software configuration process that requires HTTP requests to at least one web server. In response to the request, timing service 530 directs processing system 550 to maintain timing information associated with HTTP requests to one or more web servers in association with the workflow, wherein the timing information comprises at least timestamps associated with initiating each of the HTTP requests and receiving responses to each of the HTTP requests. In some implementations, the timing information may be maintained as a log that indicates the times associated with initiating and ending and HTTP request.

In addition to maintaining local timing information associated with the HTTP requests for a workflow, timing service 530 further directs processing system 550 to obtain, from the one or more web servers, log information for operations initiated from the HTTP requests to the one or more web servers, wherein the log information comprises at least timestamps associated with starting each of the operations and ending each of the operations. The log information may be obtained when requested by computing system 500 or may be provided automatically from each of the one or more web servers. In some implementations, the log information may be provided following the completion of the workflow (e.g., last user feedback or end of the last HTTP request), however, at least a portion of the log information can be provided prior to completing the workflow.

After obtaining the log information, timing service 530 directs processing system 550 to generate a timing diagram, wherein the timing diagram indicates times for initiating each of the HTTP requests and receiving responses to each of the HTTP requests, and wherein the timing diagram further indicates times for starting each of the operations and ending each of the operations. In some implementations, the display for each of the HTTP requests may indicate child operations that were spawned in response to the HTTP request. For example, a first HTTP request may spawn a controller operation in the web server, which itself spawns a method in the web server. The display may indicate that the HTTP request spawned the controller and may further indicate that the controller spawned the method.

In some implementations, the timing diagram may promote or identify HTTP requests of interest or operations of interest at the one or more web servers. These events of interest may be identified based on durations associated with the HTTP request or operation, based on latencies associated with initiating the HTTP request or operation, or some other factor. In at least one example, the duration of an HTTP request or an operation can be compared to a threshold value or a previous iteration of the same HTTP request or operation. When the HTTP request or operation exceeds the threshold value or differs by threshold amount from the previous iteration, the HTTP request or operation can be identified as an event of interest. Once an HTTP request or operation is identified as being of interest, the HTTP request can be promoted within the timing diagram. The promotion may include a notification added to the timing diagram indicating the HTTP request or operation, an increased size of any duration or timing information associated with the HTTP request or operation, or some other notification in the timing diagram. In some examples, timing service 530 directs processing system 550 to provide additional information about the triggering or cause of the HTTP request or operation to be classified as being of interest. The information may include the threshold that was exceeded, comparisons to other HTTP requests or operations, or some other information associated with the item of interest.

Although demonstrated as generating the timing diagram at the client system with the workflow, the timing diagram may be generated by a separate system in some examples. For example, the timing information from the client may be communicated to the other computing system along with the log information from the web server. The information can then be used to generate a timing diagram.

The included descriptions and figures depict specific implementations to teach those skilled in the art how to make and use the best mode. For teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method comprising:
identifying a request to monitor a workflow in a client system, wherein the workflow comprises a software wizard for configuring an application;
in response to the request, maintaining timing information associated with HTTP requests to one or more web servers in association with the workflow, wherein the timing information comprises at least timestamps associated with initiating each of the HTTP requests and receiving responses to each of the HTTP requests;
obtaining, from the one or more web servers, log information for operations initiated from the HTTP requests to the one or more web servers, wherein the log information comprises at least timestamps associated with starting each of the operations and ending each of the operations;
monitoring one or more times associated with user feedback in the workflow; and
generating, for display, a timing diagram based on the timing information and the log information, wherein the timing diagram indicates times for initiating each of the HTTP requests and receiving responses to each of the HTTP requests, wherein the timing diagram further indicates times for starting each of the operations and ending each of the operations, and wherein the timing diagram further indicates the one or more times associated with user feedback to the workflow.

2. The method of claim 1, wherein the operations comprise at least a controller operation and a method operation.

3. The method of claim 1 further comprising:
identifying one or more operations of interest from the operations based on the log information; and
promoting portions of the timing diagram related to the one or more operations of interest.

4. The method of claim 3, wherein identifying the one or more operations of interest from the operations is further based on one or more duration limits associated with the operations.

5. The method of claim 1 further comprising:
identifying one or more HTTP requests of interest from the HTTP requests based on the log information or the timing information; and
promoting portions of the timing diagram related to the one or more HTTP requests of interest.

6. The method of claim 5, wherein identifying the one or more HTTP requests of interest from the HTTP requests is further based on one or more duration limits associated with the HTTP requests.

7. A computing apparatus comprising:
a storage system;
a processing system operatively coupled to the storage system; and
program instructions stored on the storage system that, when executed by the processing system, direct the computing apparatus to:
identify a request to monitor a workflow in a client system, wherein the workflow comprises a software wizard for configuring an application;
in response to the request, maintain timing information associated with HTTP requests to one or more web servers in association with the workflow, wherein the timing information comprises at least timestamps associated with initiating each of the HTTP requests and receiving responses to each of the HTTP requests;
obtain, from the one or more web servers, log information for operations initiated from the HTTP requests to the one or more web servers, wherein the log information comprises at least timestamps associated with starting each of the operations and ending each of the operations;
monitor one or more times associated with user feedback in the workflow; and
generate, for display, a timing diagram, wherein the timing diagram indicates times for initiating each of the HTTP requests and receiving responses to each of the HTTP requests, wherein the timing diagram further indicates times for starting each of the operations and ending each of the operations, and wherein the timing diagram further indicates the one or more times associated with user feedback to the workflow.

8. The computing apparatus of claim 7, wherein the operations comprise at least a controller operation and a method operation.

9. The computing apparatus of claim 7, wherein the program instructions further direct the computing apparatus to:
identify one or more operations of interest from the operations based on the log information; and
promote portions of the timing diagram related to the one or more operations of interest.

10. The computing apparatus of claim 9, wherein identifying the one or more operations of interest from the operations is further based on one or more duration limits associated with the operations.

11. The computing apparatus of claim 7, wherein the program instructions further direct the computing apparatus to:
identify one or more HTTP requests of interest from the HTTP requests based on the log information or the timing information; and
promote portions of the timing diagram related to the one or more HTTP requests of interest.

12. The computing apparatus of claim 11, wherein identifying the one or more HTTP requests of interest from the HTTP requests is further based on one or more duration limits associated with the HTTP requests.

13. A system comprising:
one or more web servers; and
a client system configured to:
identify a request to monitor a workflow in a client system, wherein the workflow comprises a software wizard for configuring an application;
in response to the request, maintain timing information associated with network protocol requests to the one or more web servers in association with the workflow, wherein the timing information comprises at least timestamps associated with initiating each of the network protocol requests and receiving responses to each of the network protocol requests;

obtain, from the one or more web servers, log information for operations initiated from the network protocol requests to the one or more web servers, wherein the log information comprises at least timestamps associated with starting each of the operations and ending each of the operations;

monitor one or more times associated with user feedback in the workflow; and generate, for display, a timing diagram based on the timing information and the log information, wherein the timing diagram indicates times for initiating each of the network protocol requests and receiving responses to each of the network protocol requests, wherein the timing diagram further indicates times for starting each of the operations and ending each of the operations, and wherein the timing diagram further indicates the one or more times associated with user feedback to the workflow.

14. The system of claim 13, wherein the client system is further configured to:

identify one or more operations of interest from the operations based on the log information; and promote portions of the timing diagram related to the one or more operations of interest.

15. The system of claim 14, wherein identifying the one or more operations of interest from the operations is further based on one or more duration limits associated with the operations.

* * * * *